United States Patent [19]

Huber

[11] Patent Number: 5,033,611
[45] Date of Patent: Jul. 23, 1991

[54] DRIVE ROLLER UNIT

[75] Inventor: Thomas Huber, Iffeldorf, Fed. Rep. of Germany

[73] Assignee: Bavaria Cargo Technologie GmbH, Fed. Rep. of Germany

[21] Appl. No.: 508,449

[22] Filed: Apr. 13, 1990

[30] Foreign Application Priority Data

Feb. 8, 1990 [EP] European Pat. Off. ......... 90102494.3

[51] Int. Cl.$^5$ .............................................. B65G 13/02
[52] U.S. Cl. ..................................... 198/782; 198/788
[58] Field of Search ....................... 198/780, 782, 788; 244/137.1

[56] References Cited

U.S. PATENT DOCUMENTS

| 3,698,539 | 10/1972 | Schwarzbeck | 198/782 X |
| 3,712,454 | 1/1973 | McKee | 198/782 |
| 4,697,694 | 10/1987 | Huber | 198/782 |
| 4,792,037 | 12/1988 | Huber | 198/788 |

FOREIGN PATENT DOCUMENTS

| 0686259 | 1/1940 | Fed. Rep. of Germany | 198/788 |
| 819063 | 10/1951 | Fed. Rep. of Germany | |
| 1815641 | 8/1969 | Fed. Rep. of Germany | 198/788 |
| 8816438 | 10/1989 | Fed. Rep. of Germany | |
| 8816547 | 2/1990 | Fed. Rep. of Germany | |
| 1489856 | 7/1967 | France | |
| 0215213 | 5/1924 | United Kingdom | 198/782 |

Primary Examiner—Robert P. Olszewski
Assistant Examiner—James R. Bidwell
Attorney, Agent, or Firm—Sughrue, Mion, Zinn Macpeak & Seas

[57] ABSTRACT

A drive roller unit for driving articles on a conveyor track includes a drive roller which can be driven in rotation by an electric motor by way of a planetary transmission. The drive roller is mounted rotatably on a guide body which permits the roller to be movable relative to a base of the unit between a lower rest position and an upper drive position in which it is in engagement with the underside of the article to be driven. An internal gear ring which is fixedly connected to the drive roller is in the form of a crown wheel of the planetary transmission. A planet wheel of the planetary transmission meshes on the one hand with the internal gear ring and on the other hand with a sun wheel of the planetary transmission. The sun wheel is driven by the electric motor while the planet carrier of the planet wheel is fixedly connected to the guide body.

3 Claims, 3 Drawing Sheets

DRIVE ROLLER UNIT

BACKGROUND OF THE INVENTION

In one form of a drive roller unit for driving an article such as a freight container on a conveyor track, as described in U.S. Pat. No. 4,792,037, a drive roller can be driven in rotation by an electric motor means by way of a planetary transmission. The drive roller is mounted rotatably on a guide body by means of which it is movable relative to a base of the unit between a lower rest position and an upper drive position in which it is in engagement with the underside of the article to be driven, the guide body having circular-cylindrical outside peripheral surface regions on which the drive roller is concentrically mounted. The drive roller is substantially in the form of a hollow circular cylinder and the electric motor means, the guide body and the planetary transmission are arranged in the interior of the hollow-cylindrical drive roller. Disposed non-rotatably at the inside of the hollow-cylindrical drive roller is an internal gear ring which is concentric with respect thereto, and the guide body is mounted rotatably about an axis of rotation which is stationary with respect to the base and which is eccentric with respect to its circular-cylindrical outside peripheral surface regions. The stator of the electric motor means, which includes the field winding, is rigidly and non-rotatably connected to a stator housing which serves as the guide body, whose circular-cylindrical outside peripheral surface is arranged eccentrically with respect to the axis of rotation of a drive gear which can be driven by the electric motor means. With that design configuration, when the motor means is switched on, the rotor which is disposed in the interior of the stator initially remains in a stationary condition because of its inherent inertia so that the motor torque acting between the stator and the rotor rotates the stator arrangement and therewith the guide body formed by its housing, around the axis of rotation, which is stationary with respect to the base, of the drive gear which meshes with the internal teeth of the drive roller. As a result, because the guide body is eccentric with respect to the axis of rotation of the drive gear, the drive roller which is mounted on the guide body is moved out of its lower rest position into the upper operative position in which it comes to bear against the bottom of the article to be conveyed, which is disposed above it.

A problem with a design configuration of that kind is that the stator arrangement which includes the field winding must rotate at least over a limited angle of rotation, in operation of the drive roller unit. Therefore, a slip ring assembly of expensive configuration must be provided for the supply of current to the field winding of the stator arrangement. A slip ring assembly of that kind not only complicates the construction of the drive roller unit but it also has a tendency to suffer from fouling and susceptibility to trouble so that short periods between maintenance operations are required.

A further drive roller unit as disclosed in U.S. Pat. No. 3,698,539 has a base or main frame which is to be secured for example to the floor of an aircraft freight compartment, and a mounting frame structure which is mounted at one end pivotably to the main or base frame. In the vicinity of the pivot axis the mounting frame structure carries a motor while at a spacing relative to the pivot axis it has a drive roller which is mounted in such a way as to be rotatable about an axis which is stationary with respect to the mounting frame structure, as well as a cam control arrangement which is connected to the free end of the mounting frame structure and by means of which the mounting frame structure is pivotable relative to the main frame from the rest position into the operative position. The output shaft of the motor is connected by way of a transmission train to the input of a planetary transmission, of which one input is coupled by way of a transmission arrangement to the drive shaft of the drive roller while the other output of the planetary transmission drives the cam control unit.

In the rest condition the mounting frame structure lies on the main frame so that the drive roller is disposed in a lowered condition at a spacing from the bottom of a freight container positioned above same on a roller conveyor track. In order to set the freight container in movement on the roller track, the motor is firstly switched on to drive the input of the planetary transmission. At that time the drive roller is prevented from rotating by means of a slipping clutch with a predetermined braking torque so that the drive moment of the motor inevitably acts by way of the other output of the planetary transmission on the cam control unit which, as a result, by virtue of its cams which bear against the main frame, pivots the mounting frame structure upwardly into the operative position until the drive roller comes into engagement with the underside of the bottom of the freight container. The weight of the freight container causes the movement of the cam control unit to be blocked thereby as the drive roller is pressed against the bottom of the container. As a result the output of the planetary transmission which drives the cam control unit is also blocked so that the other output of the planetary transmission, which is connected to the drive roller, transmits thereto a braking moment which overcomes the braking torque of the slipping clutch so that the drive roller, while being pressed against the bottom of the container, begins to rotate and the container is moved forwardly in a direction which is dependent on the direction of rotation of the drive motor.

A problem which arises with that arrangement in practice is that the entire transmission arrangement from the motor to the drive roller on the one hand and to the cam control assembly on the other hand is of a very expensive design configuration and comprises a large number of components. In addition a cam control assembly is required so that the overall construction includes a large number of mechanically moved components. As a result not only does the arrangement involve a high level of manufacturing costs but it is also of a large size and is of high weight, which is extremely undesirable in regard to aircraft construction. Furthermore the large number of components which are moved relative to each other gives rise to an undesirable susceptibility to wear and short periods of time between maintenance operations are required in order to guarantee the high level of reliability required in operating aircraft.

Furthermore the slipping clutch used in that drive roller unit is what is known as a 'fluid-friction clutch', the operating characteristics of which are highly dependent on temperature. Due to the high temperature differences which may occur in operation in the freight compartment of an aircraft, it is therefore necessary for the maximum torque of the slipping clutch to be selected at such a high level that the torque does not fall below the necessary minimum value, even at the most disadvantageous temperatures. However that gives rise to high force peaks when initiating the rotary movement of the drive roller when it is being pressed against the bottom of the container, and those force peaks act on the floor structure of the freight compartment of the aircraft. That is extremely undesirable in practice as certain floor structure limit loadings should not be exceeded and in addition shock loadings are extremely undesirable.

In particular however the above-described drive roller unit is of large size and the individual components are disposed more or less without protection in juxtaposesd arrangement so that in operation it is not only necessary to reckon on the assembly suffering from fouling and contamination, with the operational faults which are caused thereby, but it is also susceptible to damage caused by objects penetrating into the mechanism or due to the direct action of a force thereon.

A drive roller unit which is similar in terms of design and mode of operation is to be found in U.S. Pat. No. 4,697,694 in which, besides being of large size, the arrangement may also suffer in operation from problems due to foreign bodies penetrating into the mechanism or due to the effect of a force acting thereon.

SUMMARY OF THE INVENTION

An object of the invention is to provide a drive roller unit which is of enhanced reliability and which is of a simplified design configuration.

Another object of the invention is to provide a drive roller unit which has less susceptibility to damage and fouling by virtue of an improved structural design.

Still another object of the invention is a drive roller unit which includes a reduced number of components, resulting in the unit being of lower weight.

Yet another object of the invention is a drive roller unit which is well suited to operation in an aircraft by virtue of being of low weight, compact size, and a high degree of operational reliability.

These and further objects are attained by a drive roller unit in accordance with the principles of the present invention.

The design configuration of the unit according to the invention provide that the moving components, namely the drive motor, the guide body and the planetary transmission, are disposed in the interior of the drive roller so that those elements are protected from fouling and damage. The invention also provides a simplification in construction relative to the state of the art, by virtue of the omission of the transmission arrangement, and in particular the drive gear, required in the prior-art units discussed in the opening part of this specification.

In a construction which is preferred in accordance with the invention, the stator of the electric motor means which is arranged within the guide body in the form of a hollow body is fixedly connected to the guide body, with the rotor and the stator being arranged concentrically with respect to each other and concentrically with respect to the circular-cylindrical outside peripheral surface regions of the guide body. The arrangement provides for particularly good utilisation of the available space in the interior of the drive roller and the guide body which is in the form of a hollow body so that, with the drive roller unit being of given external dimensions, a particularly large and therefore also powerful motor can be used.

Normally, in the above-indicated construction, the article to be driven such as a freight container lies on the drive roller in the rest position, and holds it fast. As a result the drive roller is prevented from rotating when it is switched on and it therefore moves from its lower rest position into its upper operative position to press against the bottom of the freight container. If it is desired however that the drive roller also moves upwardly into the operative position when it is switched on, even without an article lying thereon, it may be provided that the rotary movement of the drive roller is braked relative to the base by means of a brake with a defined braking moment.

The brake is advantageously in the form of a roller friction brake which engages between a gear meshing with the internal gear ring of the drive roller, and a mounting trunnion which is non-rotatably connected to the base of the unit and which is concentric with respect to the axis of rotation of the guide body. That configuration provides almost wear-free operation of the brake, with a simple structure involving a small number of components.

In an alternatively preferred embodiment of the invention the stator of the electric motor means which is arranged within the guide body in the form of a hollow body is fixedly connected to the base of the unit while the guide body is mounted rotatably on the stator. In that arrangement the rotor and the stator of the electric motor means are arranged concentrically with respect to each other and with respect to the axis of rotation of the guide body, but are correspondingly eccentric with respect to the circular-cylindrical outside peripheral surfaces of the guide body. That construction provides that there is no need for a brake as in the embodiment just referred to above, even when the drive roller is to move upwardly out of its rest position into the operative position when it is switched on, even without an article lying thereon to apply a braking effect thereto. In addition, the slip ring arrangement which is required in the above-discussed embodiment for the supply of current to the stator is also eliminated as in fact in this latter construction the stator is fixedly connected to the base of the unit and therefore the arrangement can use a fixed power line assembly.

Preferably the planet carrier of the planet wheel may be in one piece with the guide body, thereby providing a simplification in structure, in all the above-indicated embodiments.

Further objects, features and advantages of the invention will be apparent from the following description of preferred embodiments.

DESCRIPTION OF PREFERRED EMBODIMENTS

Figure 1:
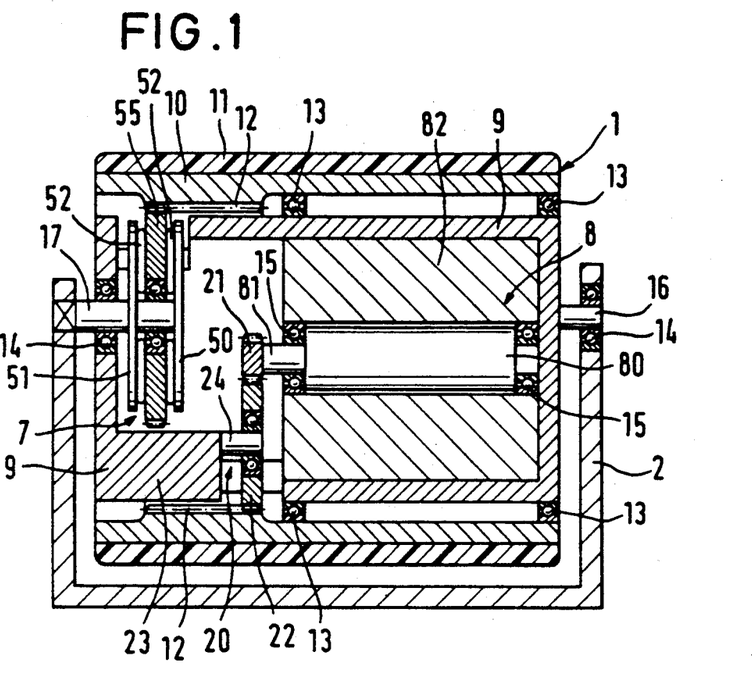
FIG. 1 is a highly diagrammatic vertical longitudinal section of a first embodiment of a drive roller unit according to the invention.

Referring to FIG. 1, the basic construction and the mode of operation of the first embodiment of a drive roller unit according to the invention will first be described. For the purposes of description and for better understanding of the basic principle, FIG. 1 is shown in highly simplified and diagrammatic form.

As shown in FIG. 1, the drive roller unit basically comprises a drive roller 1 which is substantially in the form of a hollow circular cylinder and the interior of which accommodates a guide body 9, a motor means 8, a planetary transmission 20 and a brake 7. The motor means 8 is drivingly coupled by way of the planetary transmission 20 to the guide body 9 and the drive roller 1 respectively. The entire drive roller unit is mounted in a base 2 which is fixed in a roller conveyor track. The guide body 9 has a substantially circular-cylindrical outside surface on which the drive roller 1 is rotatably mounted by means of the rolling bearings 13. The guide body 9 is mounted rotatably relative to the base 2 about an axis of rotation which is eccentric with respect to its cylindrical outside surface, on a mounting trunnion 16 at the axial end which is at the right in FIG. 1, and on a mounting trunnion 17 at its axial end which is at the left in FIG. 1, by means of the rolling bearings 14. The guide body 9 is in the form of a hollow body, with the electric motor means 8 being accommodated in the right-hand part of the interior thereof. The electric motor means 8 includes a stator 82 which is fixedly connected to the guide body 9 and which includes the field winding of the electric motor means 8, which is connected to the power supply of the base 2 by way of a contact arrangement (not shown). The stator 82 is arranged concentrically with respect to the circular-cylindrical outside surface of the guide body 9 and disposed within the stator 82, once again concentrically with respect to the outside surface thereof, is a rotor 80 which is mounted rotatably in the stator by means of the rolling bearings 15 and which has a rotor shaft 81, the end thereof which is at the left in FIG. 1 non-rotatably carrying the sun wheel 21 of the planetary transmission.

The planetary transmission has at least one planet wheel 22 which is rotatably mounted on a mounting trunnion 24 of the planet carrier 23 and which meshes on the one hand with the sun wheel 21 and on the other hand with an internal tooth arrangement 12 of the drive roller 1, which is in the form of a crown wheel of the planetary transmission 20. The planet carrier 23 is fixedly connected to the guide body 9, or, as shown in FIG. 1, is formed in one piece therewith.

The above-mentioned brake 7 is arranged in the part of the interior of the guide body, which is at the left in FIG. 1. The brake 7 includes two brake discs 50 and 51 which are non-rotatably connected to the mounting trunnion 17 which is also non-rotatably connected to the base 2. Arranged between the brake discs 50 and 51 is a gear 55 which is rotatably mounted on the mounting trunnion 17. Disposed between the gear 55 and the side of each brake disc 50 and 51, which is towards the gear 55, is a respective plurality of peripherally distributed braking rollers 52 which are arranged inclinedly with respect to the radius. The brake discs 50 and 51 are pressed with the braking rollers 52 against the gear 55 by means of a spring arrangement (not shown). The gear 55 meshes with the internal gear ring 12 in the drive roller 1 so that, upon rotary movement of the drive roller 1, the braking moment of the brake is operative between the base 2 and the drive roller.

The drive roller 1 comprises an inner roller body 10 which is substantially in the form of a hollow cylinder and a roller casing portion 11 of elastic material, which covers the outside surface of the roller body 10. Formed on or mounted to the inner surface of the substantially hollow-cylindrical roller body 10, in the axial end thereof which is at the left in FIG. 1, is an internal gear ring 12 which is provided concentrically with the roller body 10 and which is in meshing engagement with the planet wheel 22 of the planetary transmission 20. The drive roller 1 is mounted rotatably on and in concentric relationship with the circular-cylindrical outside surface of the guide body 9, by means of the bearings 13 which are in the form of needle or ball bearings. The outside surface of the guide body is arranged eccentrically with respect to the axis of rotation of the guide body 9 on the base 2. On the one hand, that arrangement constantly ensures meshing engagement of the planet gear 22 with the internal gear ring 12, while at the same time maintaining the eccentric arrangement of the drive roller 1 and the internal gear ring 12 with respect to the axis of rotation of the guide body 9.

FIG. 1 shows the rest position of the drive roller in the lowered position in which it is out of engagement with an article (not shown) to be conveyed, which is supported on the associated roller conveyor track.

If now, starting from that rest condition, the supply of power to the electric motor means 8 is switched on, then, as in any other electric motor, a torque acts between the rotor 80 and the stator 82. Because of the higher degree of inherent inertia of the stator 82 the rotor 80 firstly begins to rotate, and in so doing drives in rotation the sun wheel 21 of the planetary transmission 20. The sun wheel 21 drives the planet wheel 22 which is in meshing engagement with the internal gear ring 12 of the drive roller, which is in the form of the crown wheel. As the drive roller 1 is braked by means of the brake 7, relative to the base, in relation to a rotary movement thereof, it initially remains in a stationary condition. As a result the planet wheel 22 must necessarily roll against the internal gear ring 12 which is stationary. As the planet wheel 22 is mounted on the mounting trunnion 24 of the planet carrier 23 which is fixedly connected to the guide body, it must necessarily entrain the guide body in that rolling movement so that the guide body which is mounted eccentrically on the mounting trunnions 16 and 17 with respect to the base 2 performs a pivotal movement in an upward direction and in so doing entrains the drive roller which is mounted thereon. As a result the drive roller 1 is moved out of its lower rest position into its upper operative position and in so doing is pressed against the underside of the article to be driven. Due to the weight of that article, further movement of the drive roller 1 and therewith also the guide body 9 in an upward direction is blocked. Due to that blocking action, the planet wheel 22 can now no longer roll against the internal gear ring 12 of the drive roller 1. It must be begin to rotate in a stationary position so that such a high level of drive torque is positively applied to the drive roller 1 that the braking moment of the brake 7 is overcome and the drive roller 1 begins to rotate. That rotation of the drive roller 1 which is pressed against the underside of the article to be conveyed applies a tangential force to the article so that, as desired, the article begins to move.

In regard to the above-described mode of operation, a point of very great importance is that the direction of rotation of the planet wheel 22 and the drive roller 1 in relation to the direction of transportation movement is so selected that in the drive position in which the drive roller 1 is pressed against the underside of the article to be driven, the article to be driven applies to the drive roller a braking moment which is due to its inherent inertia or frictional forces, in the same direction as the brake 7 also provides, starting from the rest position. It is only in that way that it is possible to ensure that the inhibiting braking effect in respect of the article to be conveyed causes the driver roller 1 to be pressed against the bottom of the article in the same manner as was initially produced by the brake 7. Choosing the wrong direction of rotation of the planet wheel 22 and the internal gear ring 12 of the drive roller 1 would impede that self-holding function of the drive roller in the upper rest position.

It is to be noted at this point that the brake 7 may also be omitted in certain situations of use. It may be assumed that the rest position of the drive roller 1 is so selected that, in the rest position thereof, with the electric motor means in the switched-off condition, an article to be conveyed already bears against the surface of the drive roller 1. If, with that configuration, the electric motor means 8 is switched on, then the article resting on the drive roller 1 applies a sufficient braking moment that initially the above-described rolling movement of the planet wheel 22 against the internal gear ring 12 takes place and the planet wheel 22 of necessity seeks to pivot the guide body 9 upwardly about its axis of rotation together with the drive roller 1. That pivotal movement is permitted and restricted by the resiliency of the roller casing portion 11, but it means that the drive roller 1 is pressed against the underside of the article to be conveyed so that further pivotal movement is prevented and the planet wheel 22 causes the drive roller 1 to rotate in the above-described manner.

If now, starting from that driving operative condition, the supply of power to the electric motor means 8 is switched off, the rotor 80 of the electric motor means 8 comes to a halt relative to the stator 82 so that the torque applied to the drive roller 1 by the planet wheel 22 disappears, as well as the drive torque for rotating the guide body 9 upwardly. Because of the eccentric axis of rotation of the guide body 9 and the resulting asymmetric distribution of weight the guide body 9 therefore pivots back into its rest position as shown in FIG. 1 and, in performing that pivotal movement, entrains the drive roller 1 so that the drive roller 1 again comes out of engagement with the bottom of the article to be conveyed or at least, in a construction without a particular brake 7, is no longer pressed against the bottom of the article.

As diagrammatically indicated, the optionally provided brake 7 is in the form of a mechanical roller friction brake as already described hereinbefore.

A practical configuration of the first embodiment of the drive roller unit according to the invention, being shown in simplified form in respect of many details, will now be described with reference to FIG. 3.

Figure 3:
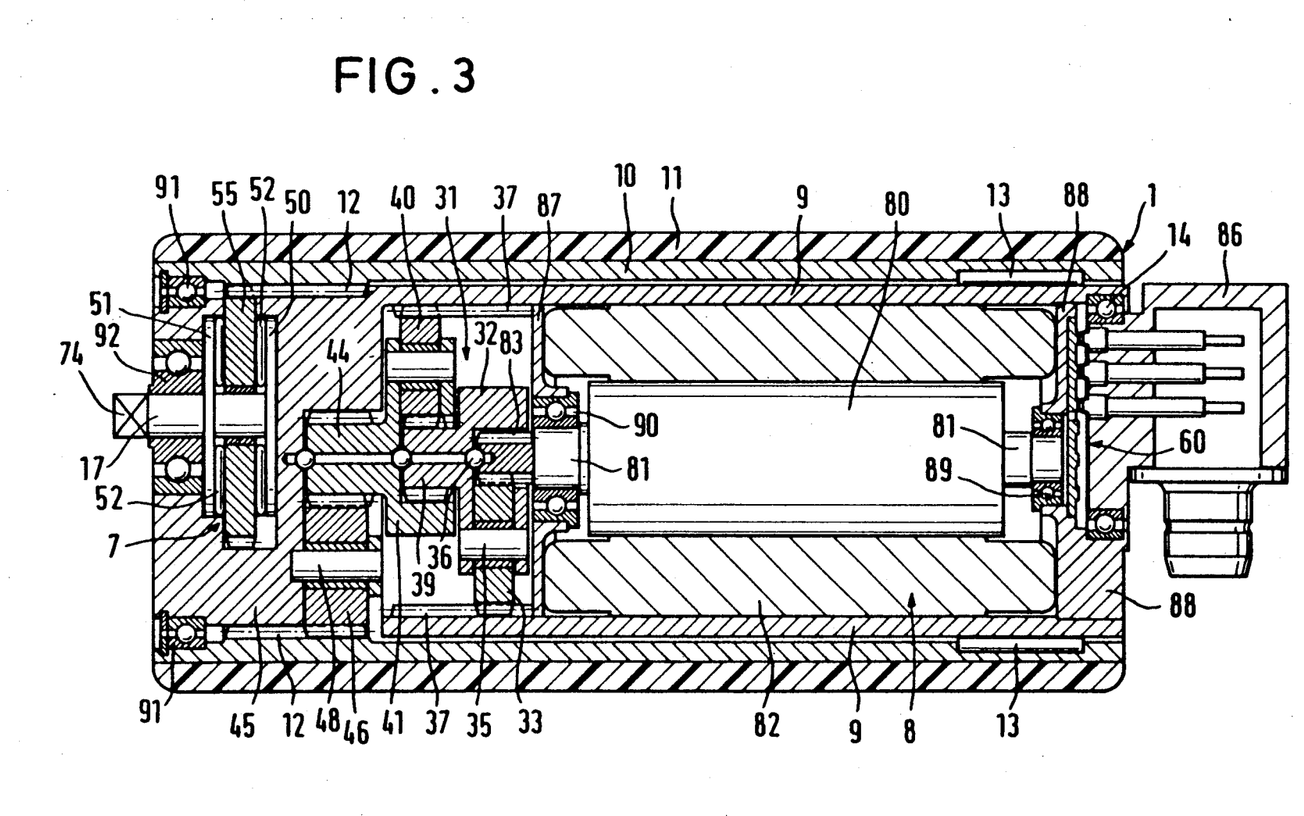
FIG. 3 is a simplified view in longitudinal section of a practical construction of the first embodiment of the drive roller unit shown in FIG. 1.

As shown in FIG. 3, this construction of the drive roller unit includes an outer, substantially hollow-cylindrical drive roller 1 which is rotatably mounted by means of the rolling bearings 13 and 91 on cylindrical outside peripheral surface regions of the guide body 9. Disposed in the interior of the guide body 9 which is in the form of a hollow body are an electric motor means 8 which is arranged in the right-hand part of FIG. 3, a planetary transmission 31 which adjoins same towards the left thereof, and the brake 7 which is again to the left of the planetary transmission 31.

The electric motor means 8 includes a stator 82 including the field winding (not shown), and a rotor 80 which is rotatably mounted concentrically within the stator 82 in rolling bearings 89 and 90 respectively. The stator 82 is arranged concentrically with respect to the circular-cylindrical outside peripheral surface regions of the guide body 9 and is fixedly connected to the guide body 9. The supply of power thereto is by way of an only diagrammatically indicated contact assembly 60 comprising slip rings, the contact assembly 60 being connected to the power supply of the base by way of a connecting housing 86 which is fixedly connected to the base.

For the purposes of mounting the rotor 80, arranged in the interior of the guide body 9 and fixedly connected thereto on the right-hand side in FIG. 3 is a substantially radial mounting flange 88 in which the right-hand end of the rotor shaft 81 is mounted by way of a rolling bearing 89. The left-hand end of the rotor shaft 81 is mounted by way of the rolling bearing 90 in a further mounting flange 87 which is also fixedly connected to the guide body or is formed integrally therewith.

The connecting housing 86 is in the form of a hollow body which serves on the one hand for fixing to the base 2 and on the other hand for providing for the supply of power to the field winding of the stator 82 of the electric motor means 8. The interior of that hollow body may accommodate various components such as for example a thermally operated protective circuit breaker, a connecting plug for power connection to the base and the above-mentioned contact assembly 60 for the supply of power to the stator 80 which is rotatable and pivotable with respect to the base.

The guide body 9 which encloses the electric motor means 8 is mounted on the base by way of the connecting housing 86, by means of the rolling bearings 14, at the right-hand axial end in FIG. 3. The axial end of the guide body 9 which is at the left in FIG. 3 is rotatably mounted by way of the rolling bearings 92 on a mounting trunnion 17 which can be non-rotatably connected to the base 2 by means of a square portion 74. The axis of rotation of the guide body, which is determined by the rolling bearings 92 and 14, is eccentric with respect to the circular-cylindrical outside peripheral surface of the guide body 9 on which the drive roller 1 is rotatably mounted by means of the rolling bearings 13 and 91.

The drive roller 1 is substantially in the form of a hollow circular cylinder which surrounds the guide body 9. The drive roller 1 comprises a roller body 10 and a roller casing portion 11 which covers the outside surface of the roller body 10 and which is fixedly connected to the roller body 10. The roller casing portion 11 comprises a wear-resistant elastic plastic material while the roller body 10 is made from metal. Disposed in the vicinity of each of the two axial ends of the roller body 10 at the inside of the roller body 10 are respective rolling bearings 13 and 91 with which the roller body 10 is rotatably mounted on the circular-cylindrical outside peripheral surfaces of the guide body 9. The portion of the inside of the roller body 10, which adjoins the left-hand end in FIG. 3, is provided with an internal gear ring 12 which is formed concentrically with respect to the longitudinal axis of the hollow-cylindrical roller body 10.

Disposed in the interior of the guide body 9 which is in the form of a hollow body, to the left in FIG. 3 of the mounting flange 87 which supports the rotor shaft 81, is a planetary transmission 31 with three transmission stages which are disposed in succession in the axial direction. The first two transmission stages, starting from the rotor shaft 81, are provided only for the purposes of stepping down the speed of rotation while the third transmission stage provides the function, which is important in regard to the mode of operation of the drive roller unit, of pivoting the drive roller 1 and providing the rotary drive for the drive roller 1, as already described hereinbefore with reference to FIG. 1. That means that the planetary transmission 20 shown in FIG. 1 in diagrammatic form corresponds to the third stage of the planetary transmission, which is shown entirely at the left in FIG. 3.

The first two stages of the planetary transmission 31 are of conventional configuration from the point of view of the function thereof so that the following brief description is sufficient for the purposes of the man skilled in the art. In the first stage the planetary transmission 31 includes a planet carrier 32 on which three planet wheels 33 are mounted by means of mounting trunnions or stub axles 35. The planet wheels 33 rotate on a sun wheel which is formed by an external tooth configuration 83 on the left-hand end of the rotor shaft 81.

Axially towards the left in FIG. 3, formed on the first planet carrier 32 and integrally therewith is the sun wheel 39 of the second transmission stage on which the planet wheels 40 which are mounted on mounting trunnions or stub axles on the planet carrier 41 in turn rotate. Also towards the left in FIG. 3, formed integrally on the second planet carrier 41 is the sun wheel 44 of the third transmission stage, on which the planet wheels 46 of the third transmission stage rotate, those planet wheels 46 being rotatably mounted on the planet carrier 45 by means of mounting trunnions or stub axles 48. A respective bearing ball 36 is arranged between the left-hand face of each sun wheel and the associated surface, which follows same towards the left, of the respective planet carrier, in order to ensure that those adjacent components are freely rotatable relative to each other, with a low level of friction.

The planet wheels 33 and 40 of the first and second transmission stages are each in meshing engagement with a respective crown wheel 37 which extends therearound and which is in the form of an internal tooth arrangement on the guide body 9. The planet carrier 45 of the third transmission stage is fixedly connected to the guide body 9 or is provided integrally therewith, as shown in the drawing.

As already mentioned the third transmission stage of the planetary transmission 31 is of a different configuration from the first and second transmission stages. The planet wheels 46, of which only one is shown in the drawing, of the third transmission stage are in meshing engagement on the one hand with the sun wheel 44 and on the other hand with the internal gear ring 12, which is in the form of a crown wheel, of the drive roller, as described in detail with reference to FIG. 1, in respect of the planetary transmission 20.

The brake 7 is arranged in the part which is at the left in FIG. 3 of the internal cavity of the guide body 9, or the planet carrier 45 which is in the form of part of the guide body 9.

The brake 7 comprises two brake discs 50 and 51 which are both non-rotatably connected to the mounting trunnion 17 which in turn can be non-rotatably connected to the base by way of the square portion 74. Arranged between the two brake discs 50 and 51 is a gear 55 which is freely rotatably mounted on the mounting trunnion 17 and which with its external tooth arrangement meshes with the internal gear ring 12 on the drive roller 1. Arranged between the two axial faces of the gear 55 and the axial faces, which are towards same, of the brake discs 50 and 51 are respective pluralities of peripherally distributed braking rollers 52 which are each arranged inclinedly with respect to a radius.

Desirably one of the two brake discs 50 or 51 is non-rotatably connected to the mounting trunnion 24, while however being slightly axially displaceably mounted thereon. The gear mounted on the mounting trunnion 24 is also slightly axially displaceable. In this construction, a spring arrangement which is not shown in the drawings provides that the brake discs 50 and 51 and the rollers 52 are pressed in a defined manner against the faces of the gear 55, thus producing a prdetermined braking moment.

A roller friction brake of that kind is known in terms of its function and structure and therefore does not need to be described in further detail, from the point of view of the man skilled in the art.

The mode of operation of the construction just described above has already been described in detail with reference to the diagrammatic view in FIG. 1. In that connection an important point in regard to function of the arrangement is that the guide body 9 is mounted rotatably about an axis of rotation which is arranged eccentrically with respect to its outside surfaces on which the drive roller 1 is rotatably mounted. Another point of significance is that the stator 82 of the electric motor means 8 is fixedly connected to the guide body 9, and that the internal gear ring 12 of the drive roller 1 represents the crown wheel of the third transmission stage of the planetary transmission 31.

The brake 7 may be optionally provided, as already described above with reference to FIG. 1.

Figure 2:
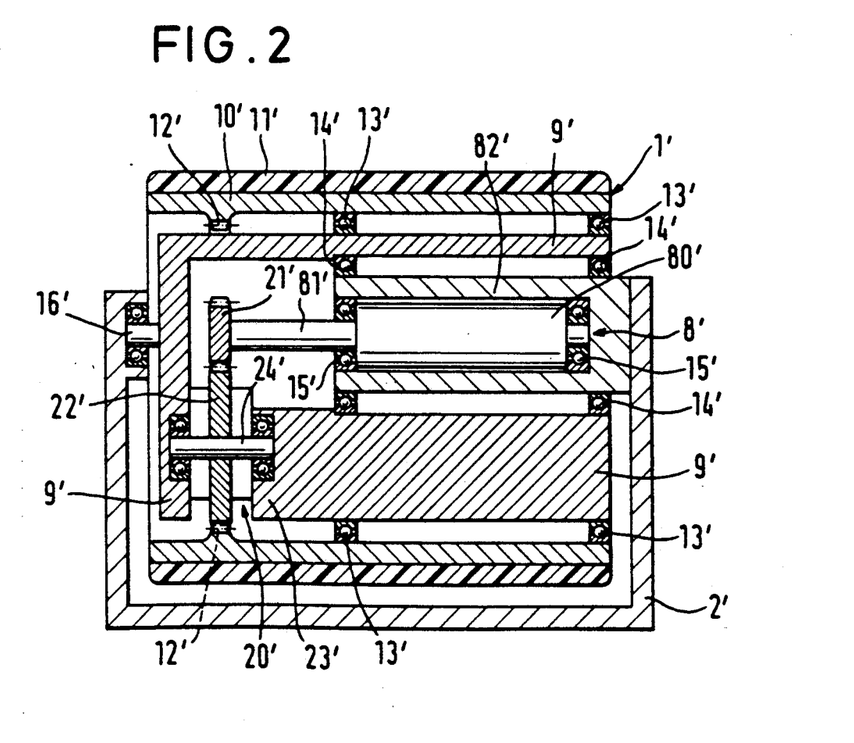
FIG. 2 is a highly diagrammatic vertical longitudinal section of a second embodiment of the drive roller unit.

The second embodiment of a drive roller unit according to the invention, which is shown in highly simplified and diagrammatic form in FIG. 2, essentially differs from the first embodiment illustrated in FIGS. 1 and 3 in that the stator 82' of the electric motor means 8' is non-rotatably and rigidly connected to the base 2' while the guide body 9' is mounted rotatably on the outside peripheral surface of the stator 82'. The outside peripheral surface of the stator 82' is of such a configuration and arrangement that the guide body 9' is mounted rotatably about an axis which is eccentric with respect to its circular-cylindrical outside peripheral surface portions.

Figure 4:
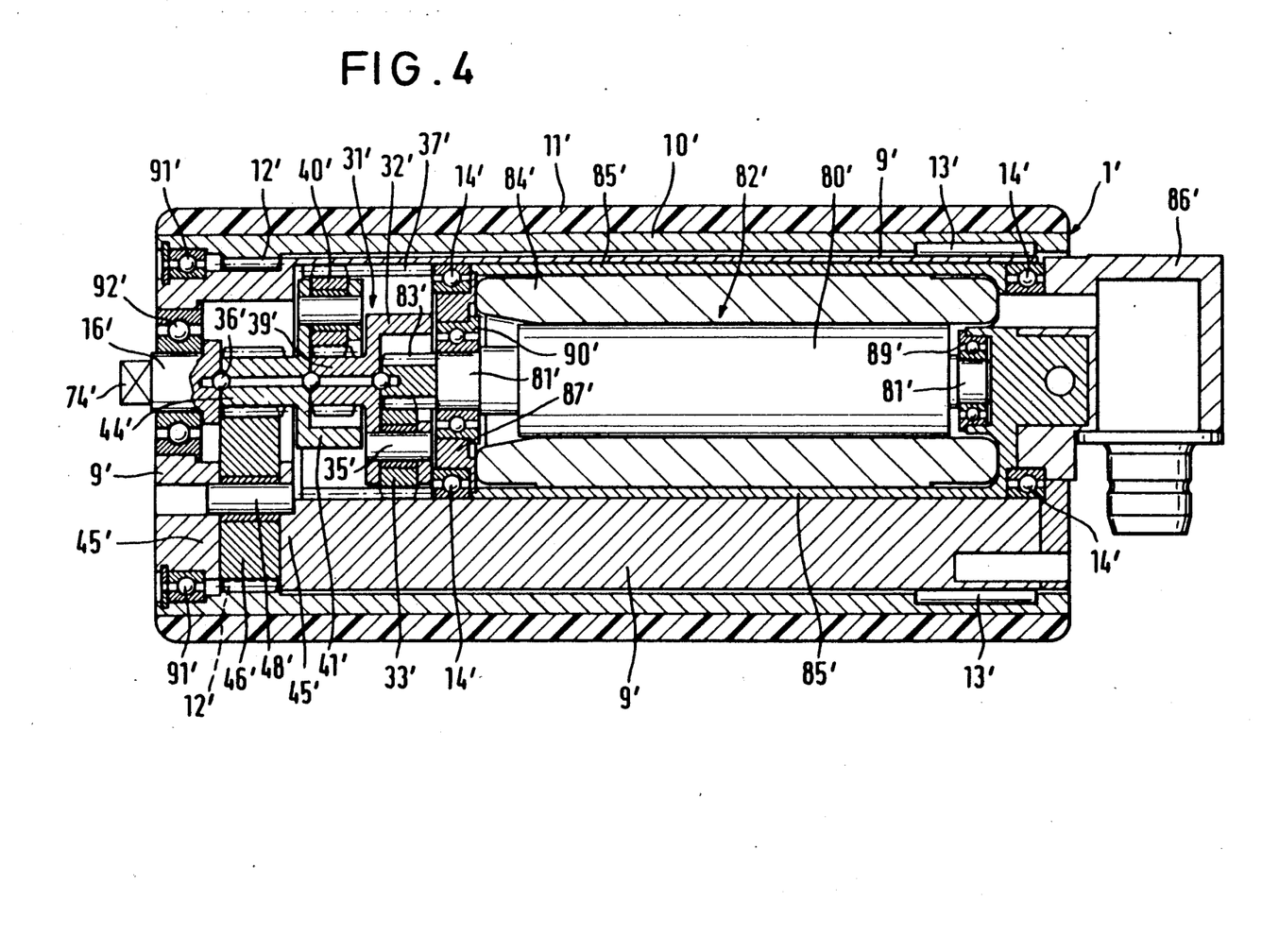
FIG. 4 is a simplified view in longitudinal section of a practical construction of the second embodiment of the drive roller unit shown in FIG. 2.

FIG. 2 and likewise FIG. 4 which relates to the same second embodiment use the same reference numerals but in each case without an apostrophe, in respect of components which correspond to the corresponding components of the first embodiment shown in FIGS. 1 and 3.

As shown in FIG. 2, in this embodiment the stator 82' is non-rotatably and rigidly connected to the base 2'. The stator 82' includes the field winding of the electric motor means so that the supply of power can be from the base 2' directly by way of fixed lines. The rotor 80' is rotatably mounted by means of the bearings 15' within the stator 82' concentrically with respect to the outside surface thereof. The sun wheel 21' of the planetary transmission 20' is connected to the end of the rotor shaft 81' of the rotor 80', which is at the left in FIG. 2.

The guide body 9' has a bore which is eccentric with respect to its circular-cylindrical outside surface on which the drive roller 1' is rotatably mounted. The electric motor means 8' is accommodated in the eccentric bore. As in the first embodiment illustrated in FIG. 1, the guide body 9' is mounted rotatably relative to the base 2' about an axis of rotation which is eccentric with respect to its circular-cylindrical outside surface. The guide body 9' is mounted in that way at the left side in FIG. 2 by means of a mounting trunnion or stub axle 16' and at the region at the right in FIG. 2, on the outside surface of the stator 82' which is concentric with respect to the mounting trunnion 16', by means of rolling bearings 14'.

It is to be emphasised that the embodiment shown in FIG. 2 does not require a particular brake 7, in comparison with the first embodiment shown in FIG. 1. In order for the drive roller 1' to move up out of the lower rest position into the upper drive position, all that is required is the inherent inertia of the drive roller 1' and the braking moments which are provided by the friction of the bearings 13' with which the drive roller 1' is mounted on the guide body 9'. That applies both in the situation in which the drive roller unit is totally unloaded when switched on and also in the other situation in which, when it is switched on, the drive roller 1' is already being braked by an article to be conveyed, which is lying thereon.

In other respects the mode of operation of the drive roller unit shown in FIG. 2 is substantially identical to that of the drive roller unit shown in FIG. 1.

If, starting from the rest condition illustrated in the drawing, the supply of power to the electric motor means 8' is switched on, a torque is operative between the rotor 80' and the stator 82'. As the stator 82' is rigidly and non-rotatably connected to the base, the rotor 80' which is mounted rotatably in the stator 82' begins to rotate and drives the planetary transmission 20' by way of the sun wheel 21'. As described hereinbefore with reference to the construction shown in FIG. 1, as a result the drive roller 1' is first pivoted out of its rest position and into the upper operative position by means of the guide body 9'. It is only after the drive roller 1' has come to bear against the underside of the article to be conveyed that the drive roller 1' begins to rotate, with the planet wheel 22' being held in a stationary position.

A practical construction of the second embodiment of the drive roller unit according to the invention, which is simplified in many details, is illustrated in FIG. 4. In this case also components which are identical to corresponding components of the construction shown in FIG. 3 or which correspond thereto in terms of function are identified by references consisting of the same reference numeral and an apostrophe.

Therefore, only a few details will now be set forth, in order to describe the differences in the structure.

The stator 82' of the electric motor means 8' comprises an inner stator body 84' which is fixedly connected to a stator housing 85' which encloses same. The stator housing 85' is rigidly and non-rotatably connected to the base by way of a connecting housing 86'. The field winding of the electric motor means, which is contained in the stator 82', is connected to the power supply of the base by way of fixed connecting lines. The rotor 80' is rotatably mounted by means of the rolling bearings 89' and 90' in concentric relationship within the stator 82'. The guide body 9' is mounted on the outside peripheral surface of the stator housing 85', by means of the rolling bearings 14', at the axial end of the guide body which is at the right in FIG. 4. At the axial end which is at the left in FIG. 4, the stator housing 85' is closed off by a radial mounting flange 87', on the outside of which the guide body 9' is mounted by means of the rolling bearing 14', while the left-hand end of the rotor shaft 81' is mounted in the radially inwardly disposed bore in the mounting flange 87'.

The end of the rotor shaft 81' which is at the left in FIG. 4 is also provided with an axial extension portion which is provided with an external tooth configuration 83' and which is in the form of the sun wheel of the first stage of a planetary transmission 31.

The planetary transmission 31 is in the form of a three-stage planetary transmission, as in the embodiment shown in FIG. 3, with the first two stages being of the same configuration as in the embodiment shown in FIG. 3 and serving exclusively to step down the speed of rotation of the electric motor means. As in the case of the embodiment shown in FIG. 3, the third stage of the planetary transmission 31' is also to perform a particular function, as described.

The axial end of the guide body 9', which is at the left in FIG. 4, is mounted by means of the rolling bearing 92' on a mounting trunnion 16' which can be non-rotatably connected to the base by way of the square portion 74'. The mounting of the guide body on the mounting trunnion 16' on the one hand and the outside of the stator housing 85' on the other hand is such that the axis of rotation of the guide body 9' is eccentric with respect to its circular-cylindrical outside peripheral surface portions on which the drive roller 1' is rotatably mounted.

It is to be emphasised in regard to this construction that, although no separate brake 7 is required, as in the first construction, the fact that the stator of the electric motor means 8' is rigidly and non-rotatably connected to the base 2' means that the electric motor means 8' must be arranged eccentrically in the guide body 9' so that, with suitable outside dimensions in respect of the drive roller 1', less space is available for the electric motor means 8', than in the construction shown in FIG. 3.

It will be appreciated that the above-described constructions have been set forth by way of example and illustration of the present invention and that various other modifications and alterations may be made without thereby departing from the spirit and scope of the invention.

What is claimed is:

1. A drive roller unit for driving an article on a conveyor track comprising:
   a base (2');
   a guide body (9') having circular-cylindrical outside peripheral surface means;
   means mounting the guide body (9') rotatably about an axis of rotation which is stationary with respect to the base (2') and which is eccentric with respect to said circular-cylindrical outside peripheral surface means of said guide body (9');
   a drive roller (1') substantially in the form of a hollow circular cylinder rotatably mounted on said outside peripheral surface means of said guide body (9') in concentric relationship therewith;
   an electric motor means (8') operable to drive the drive roller (1') in rotation;
   an internal gear ring means (12') disposed at the inside of the drive roller (1') non-rotatably relative thereto and concentric with respect thereto; and
   a planetary transmission (20') operatively disposed between the electric motor means (8') and the drive roller (1') for driving of the drive roller (1'), the electric motor means (8'), the guide body (9') and the planetary transmission (20') being arranged in the interior of the drive roller (1').

the planetary transmission comprising a crown wheel in the form of said internal gear ring means (12') of said drive roller (1'), at least one planet wheel (22') meshing with said internal gear ring means (12'), a sun wheel (21') meshing with said planet wheel (22'), said sun wheel being adapted to be driven by said electric motor means (8'), and a planet carrier which carries said at least one planet wheel (22') and which is fixedly connected to said guide body (9');

the assembly being adapted by virtue of rotational movement of said guide body (9') about said axis of rotation to move said drive roller (1') relative to said base (2') between a lower rest position and an upper drive position in which said drive roller (1') is adapted to engage with the underside of a said article to be driven which is disposed above the unit, wherein said guide body (9') has a space therein, said electric motor means (8') is disposed within said guide body (9') and includes a stator (82') fixedly connected to the base (2'), and said guide body (9') is rotatably mounted on the stator (82').

2. A drive roller unit as set forth in claim 1 wherein said electric motor means (8') includes a rotor (80') and said stator (82') which are arranged concentrically with respect to each other and with respect to the axis of the guide body (9') and correspondingly eccentrically with respect to said circular-cylindrical outside peripheral surface means of the guide body (9').

3. A drive roller unit as set forth in claim 1 wherein said planet carrier of the planet wheel (22') is formed integrally with the guide body (9').

* * * * *